INVENTOR.
ROBERT F. KRUPP
BY JAN K. WAGNER

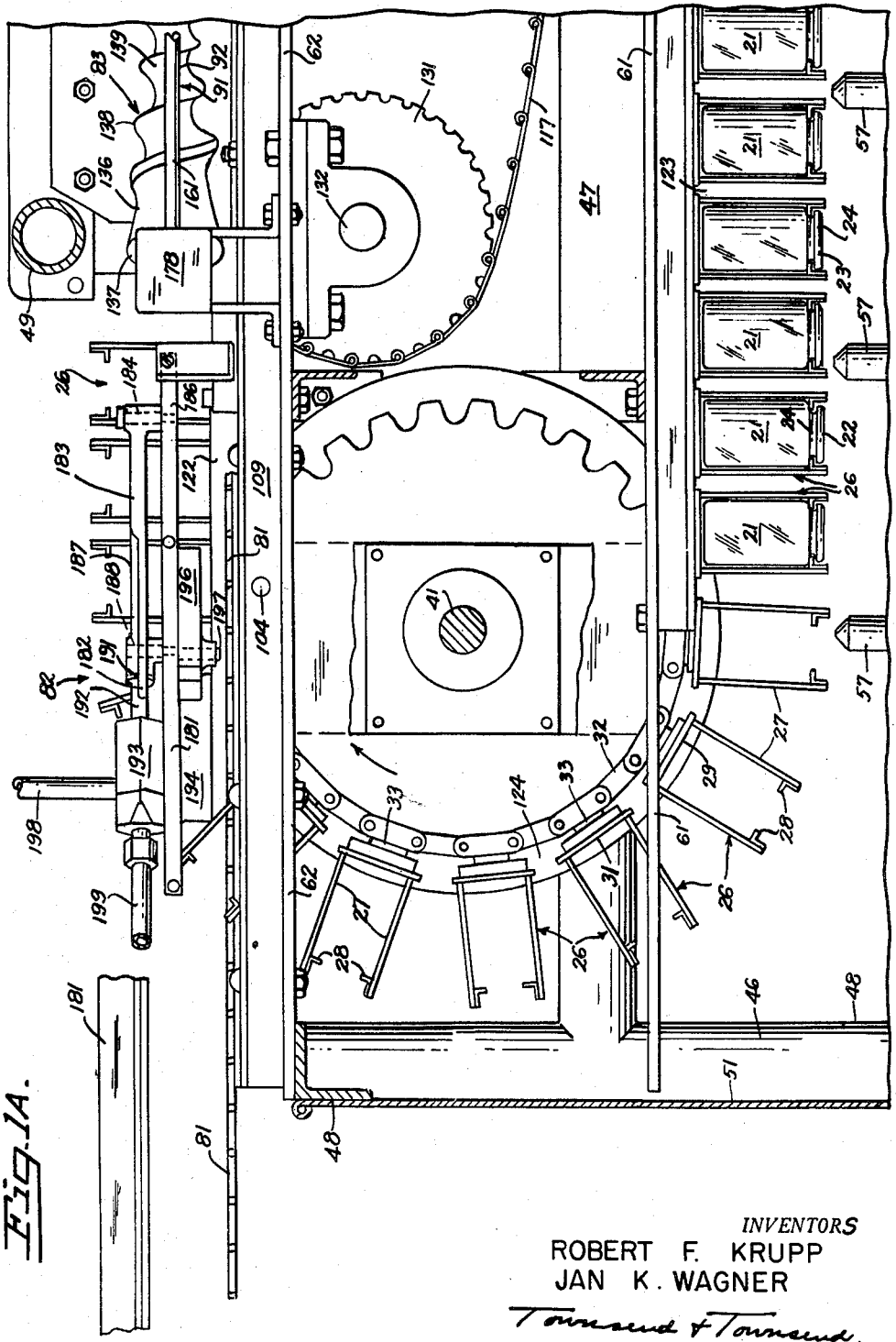

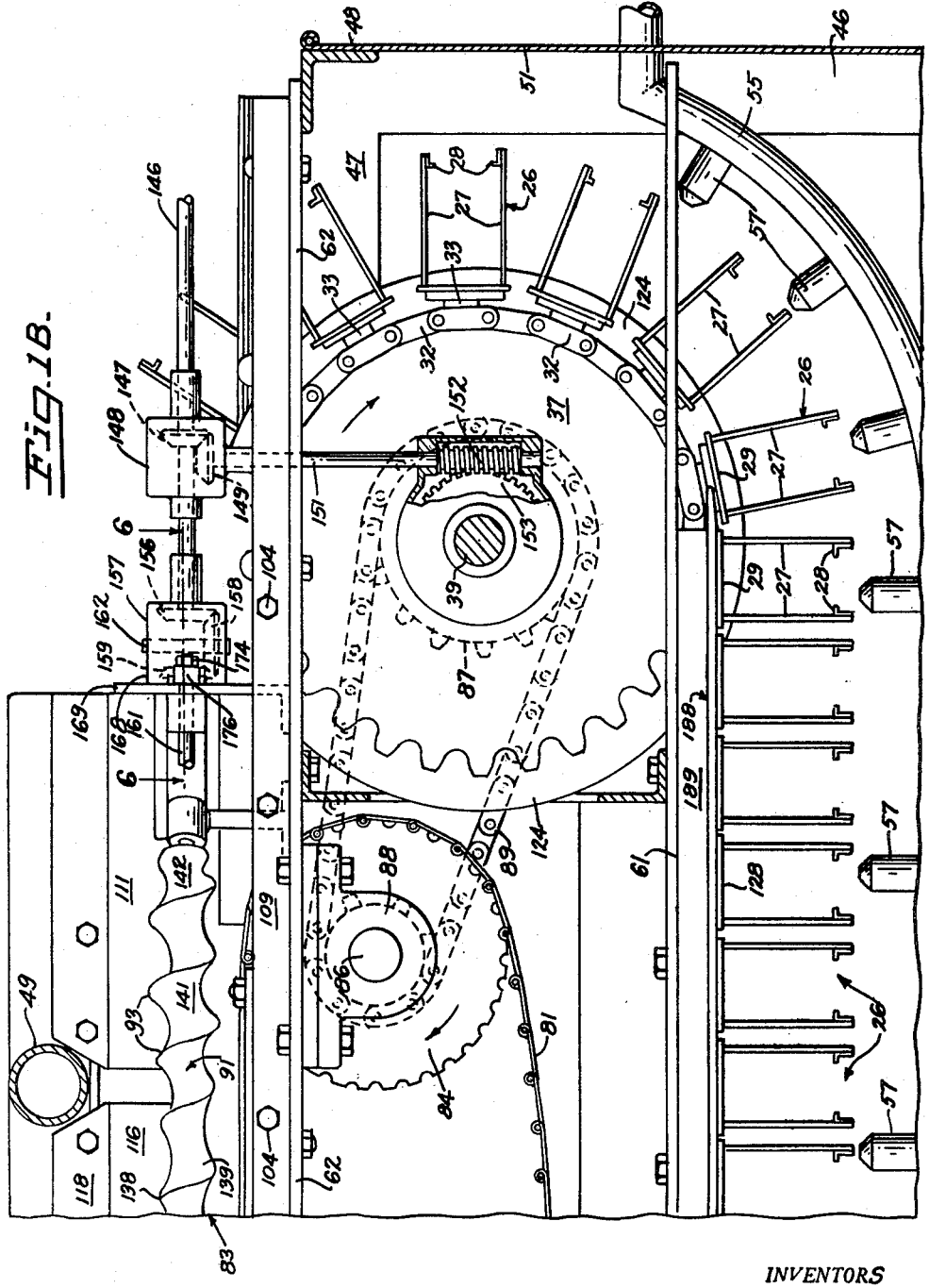

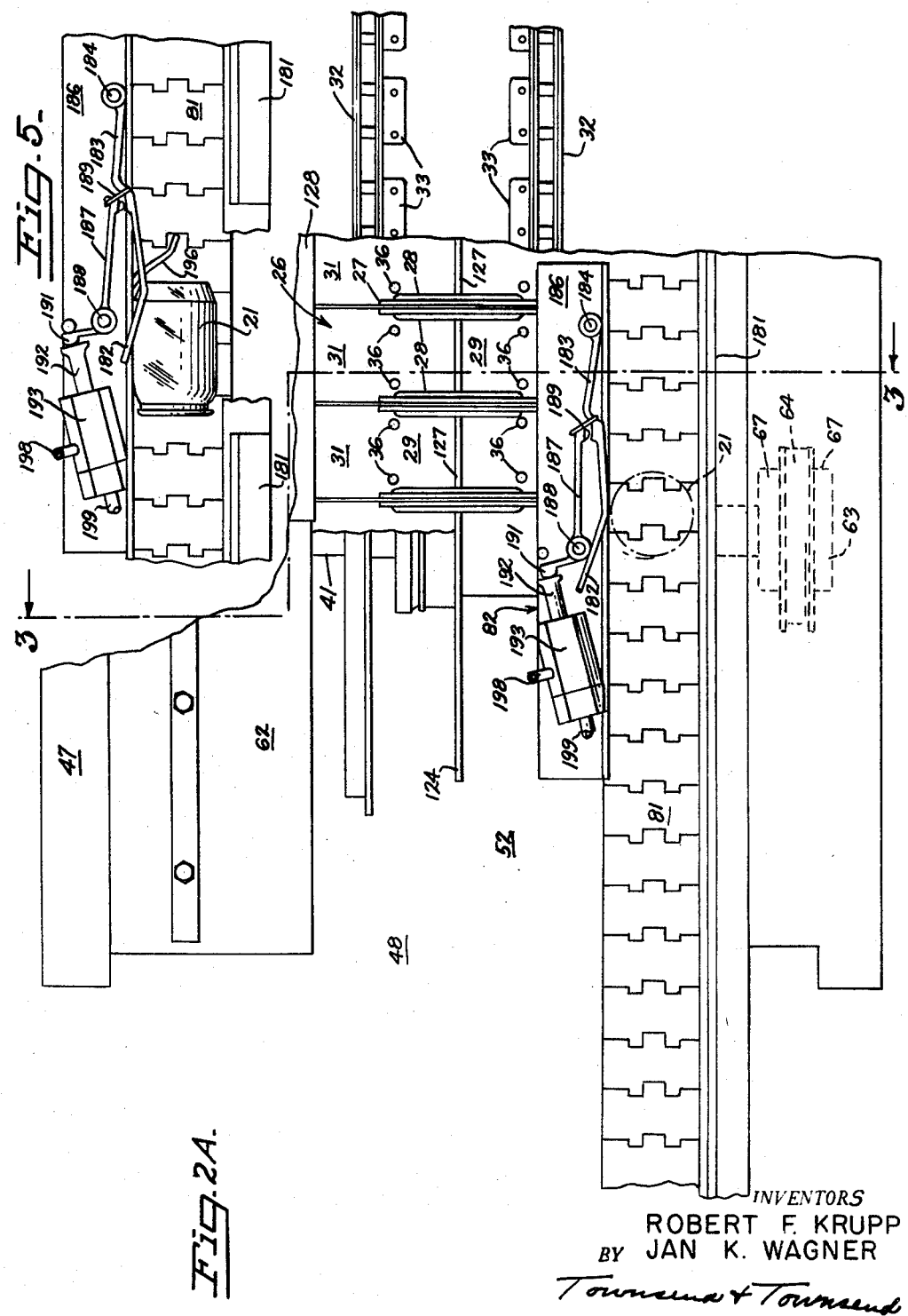

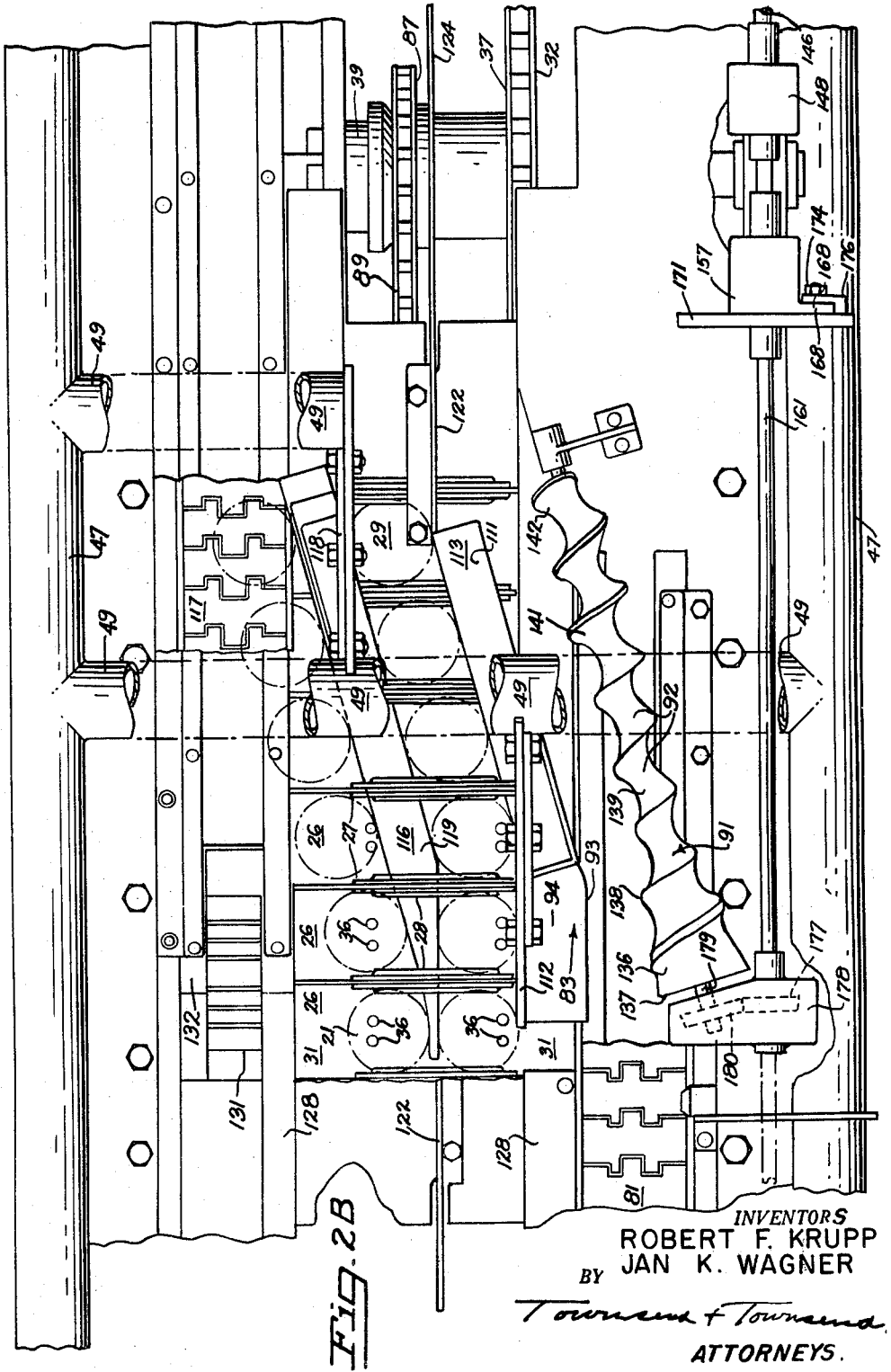

Townsend & Townsend
ATTORNEYS.

July 5, 1960  R. F. KRUPP ET AL  2,943,727
CARRIER FOR GLASS JAR HANDLING MACHINE
Original Filed July 1, 1955  7 Sheets-Sheet 6

INVENTORS
ROBERT F. KRUPP
BY JAN K. WAGNER

Townsend + Townsend
ATTORNEYS.

July 5, 1960  R. F. KRUPP ET AL  2,943,727
CARRIER FOR GLASS JAR HANDLING MACHINE
Original Filed July 1, 1955  7 Sheets-Sheet 7
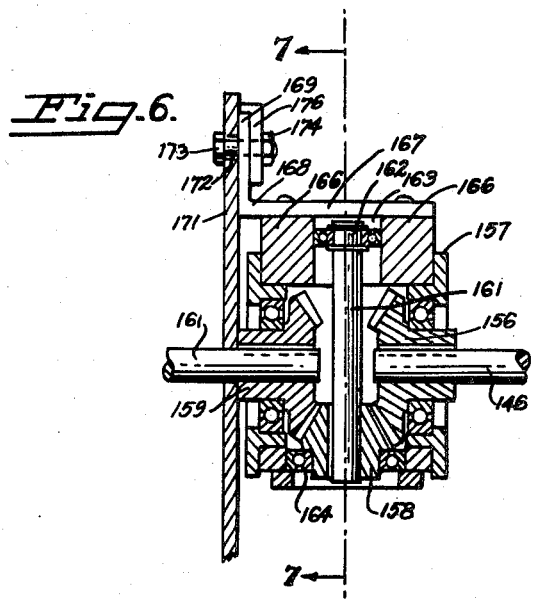
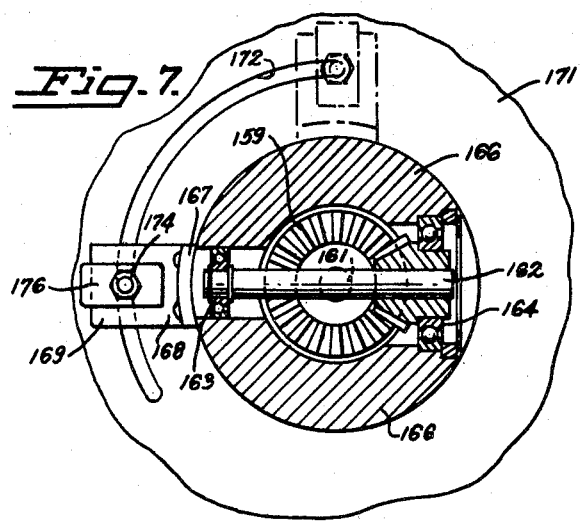
INVENTORS
ROBERT F. KRUPP
BY JAN K. WAGNER
Townsend & Townsend.
ATTORNEYS.

United States Patent Office 2,943,727
Patented July 5, 1960

2,943,727
CARRIER FOR GLASS JAR HANDLING MACHINE

Robert F. Krupp and Jan K. Wagner, Oakland, Calif., assignors to Gerber Products Company, Fremont, Mich., a corporation of Michigan Original application July 1, 1955, Ser. No. 519,318. Divided and this application Feb. 11, 1957, Ser. No. 639,523

3 Claims. (Cl. 198—188)

This invention relates to a new and improved carrier for glass jar handling machines which is characterized by the fact that conventional glass jars are carried through the machine supported by means of the circumferential groove conventionally located adjacent the open end of each jar.

This application is a division of prior application Serial No. 519,318, filed July 1, 1955, now Patent No. 2,826,207, for Glass Jar Washing Machine.

Support of the jars in the washing machine by means of the groove, as hereinafter described in detail, prevents damage to the finish of the open-mouthed jars. In conventional jar washing machines, metal parts contact either the finish of the jars or the interior thereof. Contact with the finish may chip or otherwise mar the same, causing deleterious effects in that it may cause cracking during subsequent heat processing, may cause leakage when a conventional closure is applied to the jar or may cause the consumer to believe that glass particles have entered the interior of the jar and have been mixed with the contents. Metal contact with the interior of the jar is a frequent cause of breakage, particularly when washing with hot water is required. Accordingly, the present invention obviates the undesirable effects heretofore associated with conventional washing machines.

Another feature of the invention is the fact that two or more parallel rows of jars may be carried through the machine simultaneously, the jars moving without jar to jar contact from one row to the next at appropriate intervals so that each jar may be carried around the machine several times and different steps in the washing operation performed thereupon. Thus, as hereinafter described in detail, each jar is moved into a carrier and carried around the machine twice. During the first passage, hot water is injected in the open mouths of the jars and during the second passage the jars may be allowed to drain or live steam may be injected therein to expedite the drying and heating operation. Depending upon the initial condition of the jars (i.e., whether new or used) and the required degree of sanitation, the jars may be washed with detergent, rinsed and re-rinsed before being dried with modifications readily apparent to those skilled in the art to which this invention pertains.

Other features of the invention reside in the provision of means for rapid and accurate insertion of jars into the carriers and withdrawal therefrom and further for shifting of the jars without jar to jar contact from one position in the carrier to the next in timed relationship to the cycle of operation of the machine.

Still another feature of the invention is the provision of accurate means for adjusting the timing of the intake feeding device, which in the present instance comprises a rotatable screw disposed at an angle to the path of movement of the jars as they are fed into the machine, which screw pushes the jars into the carriers in timed sequence to the movement thereof. One of the features of the timing arrangement hereinafter described in detail is the fact that it can be readily manually adjusted while the machine is operating so that the flights of the screw are properly aligned with the moving carriers and a transfer occurs despite adjustment of the speed of the machine to the processing line.

Another feature of the invention resides in the construction of the screw before referred to so that if an incoming jar is out of timing relative to the screw, it will be received in one of the flights of the screw in proper sequence, then moved with uniform speed, accelerated so that it is moved out of contact with the adjacent jar, then moved so that the component of the speed of the jar parallel to the direction of movement of the carriers is substantially equal to the speed of the carriers and then gently inserted into the carrier.

Still another feature of the invention resides in means hereinafter described in detail for rejecting from the machine jars which are tipped from the vertical, thereby preventing damage to the machine or breakage of jars which would otherwise be fed into the machine in an improper position.

In the drawings:

Figs. 1a and 1b are composite side elevations of the machine with certain parts broken away to reveal interior construction;

Figs. 2a and 2b are composite top plans of the machine, likewise with certain parts broken away to reveal the interior construction;

Fig. 3 is a transverse vertical sectional view taken substantially along the line 3—3 of Fig. 2a;

Fig. 5 is a fragmentary plan of the tipped jar-ejecting mechanism in a different position from that shown in Fig. 2a;

Fig. 6 is a vertical sectional view taken substantially along the line of Fig. 1b; and Fig. 7 is a fragmentary horizontal sectional view taken substantially along the line 7—7 of Fig. 6.

Figure 3:
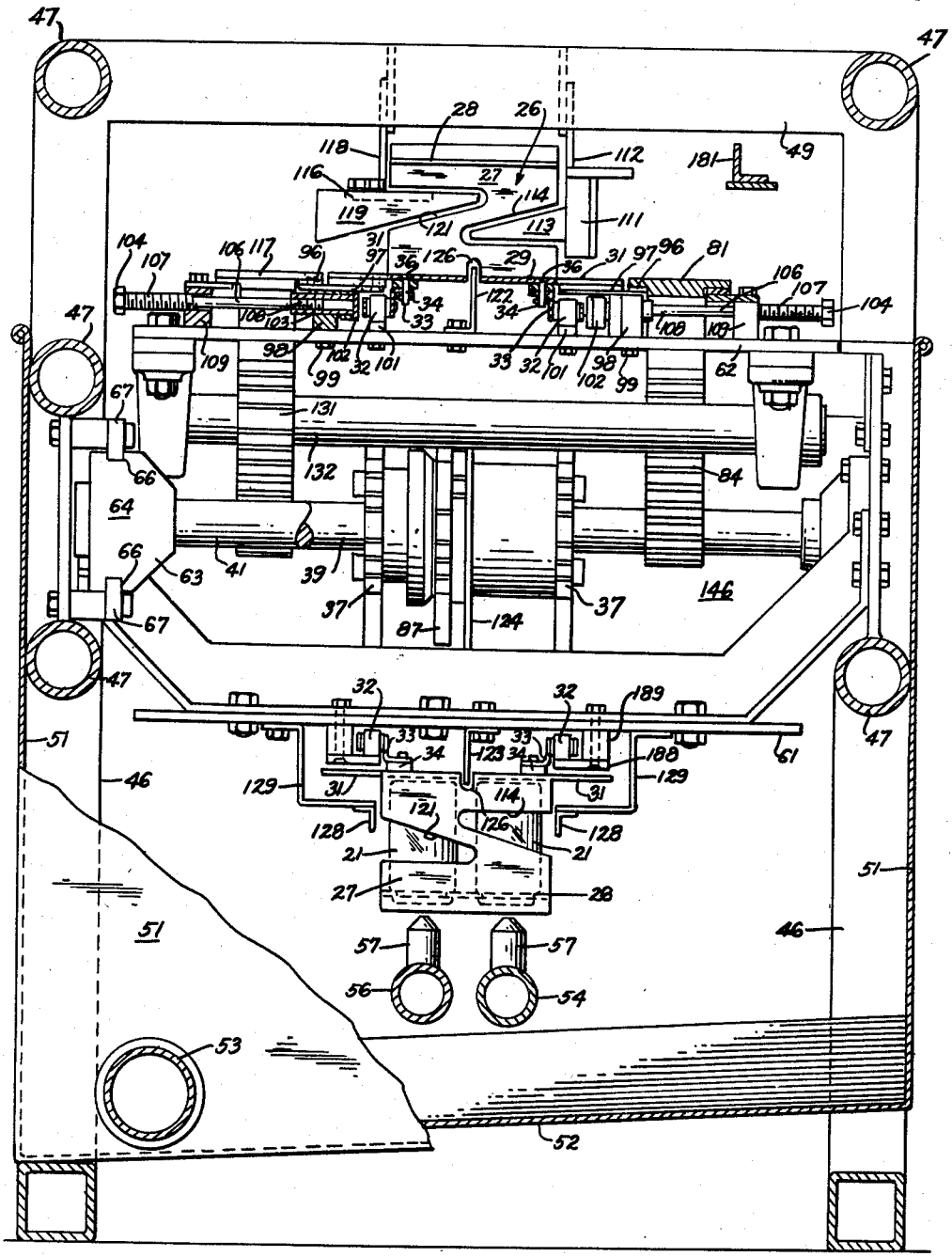
Figure 4:
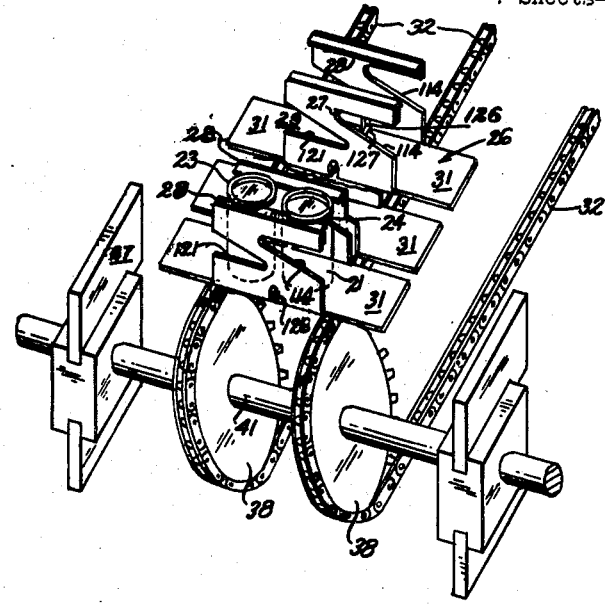
Fig. 4 is a schematic perspective view.

The present invention comprises a glass jar washing machine which is incorporated in a rigid, longitudinally extending frame. A common glass jar 21 is provided with a relatively wide mouth 22 having a finish edge 23 and immediately below the finish is a circumferential groove 24. The present invention holds the jars by means of the groove 24, thereby preventing contact of any metallic members with the finish edge 23 or the interior of the jar. Accordingly, a primary feature of the present invention is the employment of a plurality of thin, metallic carriers 26 which are essentially U-shaped in side elevation, the opposed inner faces of the flanges 27 of the carriers having ribs 28 formed of angle stock which are dimensioned and elevated with respect to the base 29 of the carriers so as to slide into the groove 24 and thus support the jar even when, as occurs in the cycle of operation of the machine, the carrier 26 is inverted. Thresholds 31, which comprise lateral extensions of the base 29 of the carrier on either side thereof, receive the jars 21 prior and subsequent to the period when they are supported by the carrier ribs 28 or the carrier base 29.

It will be observed in the accompanying drawings that the width of the flanges 27 of the carriers is slightly greater than twice the diameter of the jars 21 with which they are employed, thereby permitting two jars to be held on the carrier side by side but spaced so there is no contact of one jar with the other. It will be understood that this feature of the invention is subject to modification, inasmuch as a carrier 26 having a width to hold a single jar 21 may be employed, or a carrier having sufficient width to accommodate more than two jars may be used. In the following description of the invention, carriers having a width for two jars are employed so that the jars may be carried around the machine twice and during the first circuit are washed and during the second circuit are drained. Modification of the machine to accommodate more or less than two jars may be accomplished by one skilled in this art.

The carriers 26 are mounted for travel with main carrier link chains 32 which extend longitudinally on either side of the machine. Alternate links of the chains 32 are provided with adapting flanges 33 which project inwardly and receive quick release fasteners 34 having countersunk heads 36 which extend through holes in the base 29 of the carriers 26. By means of the quick release fasteners 34, the carries 26 can be removed for replacement in the event of damage, or may be changed over to accommodate jars of different diameter or height.

The chains 32 pass around drive and driven sprockets 37 and 38, respectively, mounted on rear and front sprocket shafts 39 and 41, respectively. Drive shaft 39 is driven from a motor (not shown) as described later in this specification.

The main frame is built of tubular members having vertical legs 46 at each corner connected by a plurality of horizontal side frame members 47 on each side and horizontal end frame members 48 at each end with horizontal top crossovers 49 intermediate the ends and connecting the uppermost horizontal side frame members 47. For the purpose of enclosing the machine and preventing the egress of water and steam, side, end and top plates 51 are attached to the frame members and suitable detachable doors (not shown) are provided for access to the interior. The floor 52 slopes downwardly to one end and one side and discharges into drain 53 which removes the water.

Either a single pipe 54 or a pair of horizontal longitudinally extending pipes 54 and 56 are located immediately below the path of the carriers 26, the pipes being provided with upwardly directed, longitudinally spaced jets 57 which force fluid into the open inverted mouths 22 of the jars held in the carriers which pass immediately above the jets. As has been indicated, in the accompanying drawings, two jars 21 are held side by side in the carriers 26 and accordingly two pipes 54 and 56 may be employed located immediately below the center lines of the respective rows of jars. Pipe 54 may be supplied with water and the other pipe 56 with dry steam to assist in drying the jars. Pipe 56 may be eliminated. It will be further understood that one or more of the pipes 54 or 56 may be formed in two or more sections, one section 55 of which may be curved as the carriers 26 feed down into the lower stretch of their course with the first section being furnished with detergent, another section with a different type of detergent or rinse water, or instead of water, air or steam to dry the jars may be injected through one of the pipes. These features of the invention are subject to wide modification, depending upon the type of jar being handled—i.e., whether it is a new or used jar—and the degree of sanitation required, in view of subsequent heat processing and the like.

A lower horizontal plate 61 is provided immediately above the lower path of the carriers 26, which plate 61 prevents water from splashing upwardly and provides support for chains 32 during the lower portion of their travel. Mounted parallel to and spaced above the lower horizontal plate 61 is an upper horizontal plate 62 located below the upper stretch of the carriers 26 and forming a mounting for other portions of the apparatus hereinafter described.

Turning now to Fig. 3, it will be seen that the top surface of intake belt 81 is substantially level with the thresholds 31 of the carriers 26 as they proceed along the top stretch of the machine. To maintain such alignment, wear strips 96 are located immediately beneath the path of the intake and discharge chains 81 and 117, respectively, which wear strips 96 are mounted on the top surface of the horizontal leveling plates 97 which ride immediately beneath the adjacent thresholds 31 of the carriers 26 and are spaced above the top horizontal plate 62 by means of spacer 98 and bolt 99. Chains 32 ride immediately below plate 97 and are held level horizontally by chain tracks 101 mounted on the top surface of upper plate 62. Lateral alignment of chains 32 is accomplished by thrust rails 102 which contact the chain pins as they pass through the machine. Thrust rails 102 are attached to internally threaded sleeves 103 laterally slidable in stationary spacer blocks 98 fixed to the top plate 62. Adjustment screws 106 have a coarse thread 107 at their outer ends and a fine thread 108 at their inner ends. The inner ends 108 engage corresponding threads in the sleeves 103. The coarse outer threads 107 engage with corresponding coarse threads in stationary spaced block 109 on the outside of the machine. By turning the head 104 of the screw 106, the thrust rails 102 may be adjusted very precisely, thereby holding chains 32 in proper alignment. There is a plurality of adjustment screws 106 and sleeves 103 on each thrust rail 102 disposed at intervals along the upper stretch of the machine and on either side thereof.

To maintain the jars in proper position in the carriers 26 and prevent contact one with another, horizontal splitters 122 are mounted on plate 62 along the top stretch of the machine, except at the shifting stations, and additional splitter 123 is provided on the bottom of bottom plate 61. Circular splitters 124 are attached to the sprocket shafts 39 and 41 at each end of the machine and maintain the jars 21 separate as they pass around the ends of their course. To accommodate splitters 122, 123 and 124, notches 126 are formed in flanges 27 and slots 127 on bases 29. Lateral displacement of jars at the top and bottom stretches of the machine (except in the zones where shifting is accomplished) is prevented by side guides 128 mounted by brackets 129 either to the top or bottom plates 62 or 61. On the lower stretch of the chains, guides 188 support the chains. Guides 188 are bolted to bottom plate 61 using spacer 189 to give proper clearance.

Discharge belt 117 is similar in construction to intake belt 81. It is driven by a sprocket (not shown) at a station remote from the washing machine. The rearward end of the discharge chain passes around idler sprocket 131 mounted on shaft 132 journalled in the frame. The end of the horizontal stretch of the discharge belt is immediately to one side of the second shifter 116 so that as the jars 21 are forced by the second shifter off the threshold 31 of the carrier, they move on to the discharge belt 117. The means for holding the discharge chain in alignment with the carrier plates and providing for wear is similar to that shown with respect to the intake belt (see Fig. 3).

The jars 21 are carried into the machine by intake belt 81 which is preferably a flat-topped conveyor chain of a common commercial type. Intake belt 81 extends from a previous station (not shown) in a horizontal stretch on one side of the machine past tipped jar ejector 82 (hereinafter described in detail) and thence to intake station 83, whereupon the belt 81 passes downwardly around intake belt drive sprocket 84 and thence horizontally forwardly out of the machine. Drive sprocket 84 is mounted on shaft 86 which is driven by means of sprockets 87 and 88 and chain 89 from carrier chain drive shaft 39.

At intake station 83 is a revolving screw 91 driven and adjusted by means hereinafter described in detail. Screw 91 has its flights 92 spaced apart substantially equal to the diameter of a jar 21 at the forward end and equal to the distance between carriers 26 at the rearward end. The diameter of the screw 91 and its angular position are such that the glass jars 21 are pushed horizontally inwardly of the machine as they proceed rearwardly under the combined force of intake belt 81 and screw 91. A rubber bumper pad 93 mounted in holder 94 attached to the frame engages the jars as they are moved by the screw 91 and prevent damage to jars 21 in the event that an entering jar is out of time with respect to the screw.

The entering jars 21 are thus pushed into carriers 26 and engaged by the ribs 28 fitting into the grooves 24 in the jars. As the carrier chains 32 bring the carriers around drive sprockets 37, the jars are inverted and pass over the jets of first pipe 54 or curved section 55. When the jars reach the horizontal stretch of the upper travel of the machine, they are engaged by first shifter 111 and move from the intake side of the carrier 26 to the discharge side of the carrier. First shifter 111 is mounted on cross-overs 49 by means of vertical brackets 112. The first shifter 111 comprises a tapered, horizontally extending member 113 which contacts the intake side of the first row of jars at a position forwardly of the intake station 83 and gradually shifts the jars laterally in the carrier as they move forwardly. It will be observed that cutouts 114 are formed in the carriers to accommodate the first shifter 111. The jars are then carried around the machine for another circuit and pass over the second pipe 56. When the jars reach the top stretch of the machine at a position in advance of first shifter 111, they are engaged by second shifter 116 which moves them laterally out of the carriers and on to discharge belt 117. Second shifter 116 is supported by depending bracket 118 attached to cross-over 49 and comprises a tapered member 119 which extends sideward from a position about the middle of the machine toward the discharge side thereof. To accommodate the second shifter 116, cutouts 121 are formed in the carrier plates, the combination of cutouts 114 and 121 giving the carrier plates a Z-shape in end elevation (see Fig. 3).

Single-thread screw 91 is mounted with its axis of rotation horizontal and disposed at an angle with respect to the direction of movement of intake belt 81 of approximately 15°. The jars entering the machine on belt 81 are in contact with each other. The function of the screw 91 in continuous jar feed is first to engage the jars without changing their velocity, then to separate the jars from contact with each other, then to accelerate the jars so that the component of their movement in a direction parallel to the direction of movement of the carriers 26 is equal to the velocity of the carriers and simultaneously inserting the jars transversely into the carriers. In order to perform this function, the screw 91 may be considered to be divided into four zones.

The first or inlet zone 136 assures a smooth entrance of the jars into the flight of the screw 91 in the event the jars proceeding along the intake belt 81 are not moving at a speed which is in time with respect to the speed of the washing machine. The screw thread is generated by a tool which comprises a cylindrical cutter of a diameter equal to the diameter of the jar 21. The central axis of the cutter is at all times perpendicular to the center line of the inlet screw zone. For a jar 2½ inches in diameter, the inlet zone 136 comprises the first 405 degrees of screw revolution. The pitch of the following surface of the flight changes in four increments during the first 405 degrees of screw revolution, namely, from a pitch of 0.75 inch to 1.50 inches to 2.00 inches to 2.50 inches on the following surface. The leading surface of the inlet zone has a constant pitch of 2.50 inches. When the first jar 21 of a line of jars enters into the inlet zone, or if any subsequent jar is out of timed relation to the screw, such jar first comes into contact with the following edge of the screw and hence accelerates in three steps corresponding to the first three pitches aforementioned. Alternatively the jar may abut the initial dead end 137 of the thread and be momentarily held until the flight of the screw is prepared to receive the jar. In the event that the jar comes into contact with the crest 138 of the thread, it is squeezed into the soft rubber bumper pad 93 mounted in holder 94 directly opposite the screw 91. The rubber deforms sufficiently so that the jar may come into proper place at the next turn of the screw.

The second zone 139 is a continuation of the conical section from zone 136, but has a constant pitch for the next 470 degrees of screw revolution. As has been stated, the jars normally come into the machine in contact with each other. In this second conical zone every jar contacts simultaneously the preceding jar and the following surface of the screw for the first 110 degrees of the middle conical zone. After the jar passes through the first 110 degrees, the preceding jar is accelerated so that the two jars are separated. The function of this conical portion is to insure that the jars in this zone are in contact with each other and thus eliminates velocity pulsations which could result from accelerations which occur in subsequent zones. The following surface of this conical zone and subsequent zones of the screw is generated by retarding the center line of the tool cutting the leading surface by approximately 1/16 inch measured along the hodograph of the center line of the cutting tool, with the result that the jar has approximately 1/16 inch play between the surfaces of the flights of the screw. It will be observed that when the screw and incoming line are full of jars, as would be the case under normal working conditions, the jars do not contact the inlet zone of the screw, but first contact the second zone. The function of the inlet zone, therefore, is to handle jars which come irregularly.

The third zone of the screw is the cylindrical zone 141. In this zone the pitch at the inception is equal to $$\frac{\text{pitch at the second zone}}{\cos 15 \deg.}$$

and increases every 360 degrees of the screw revolution until it reaches the value of 3⅛ inches, at which the component of the speed of the jar parallel to the direction of motion of the carrier 26 is substantially equal to the speed of the carriers. The function of the third zone 141 is to spread the jars apart so that the distance between their centers is equal to the distance between the centers of the carriers.

The final zone 142 of the screw is provided with a constant pitch of 3⅛ inches such that the jars are smoothly and accurately inserted into the carriers 26 in proper timed relation to the movement thereof.

The main drive shaft 39 and screw 91 are driven by means of a motor (not shown) which is connected to shaft 146 which extends horizontally longitudinally along the righthand side of the top of the machine. Shaft 146 carries a bevel gear 147 installed in housing 148 which meshes with a mating bevel gear 149 on vertical shaft 151. Vertical shaft 151 at its lower end carries a worm 152 which meshes with worm wheel 153 on shaft 39.

Shaft 146 also carries a second bevel gear 156 which is mounted in timing adjustment housing 157. Also mounted in timing adjustment housing 157 are idler bevel gear 158 and bevel gear 159. Bevel gear 159 is mounted on stub shaft 161 which projects forwardly of the machine and drives screw 91. Idler bevel gear 158 is mounted on a cross shaft 162 and bearings 163 and 164, which bearings 163 and 164 are received in an annular ring 166. Annular ring 166 is attached to the horizontal arm 167 of an L-shaped adjusting lever 168, the vertical arm 169 of which bears against bracket 171. Bracket 171 is formed with an arcuate slot 172 which receives bolt 173 which also passes through a hole in the vertical arm 169 of lever 168. Nut 174 on bolt 173 bears against a pressure pad 176 so that by tightening nut 174 the position of lever 168 is accurately fixed. By adjustment of the position of lever 168, adjustment of the timing of shaft 161 relatively to shaft 146 is accomplished.

The forward end of shaft 161 carries a bevel gear 177 in housing 178 located at the forward end of screw 91. Screw 91 has an axial shaft 179 carrying a bevel gear 180 which meshes with gear 177. Accordingly, by adjustment of the position of lever 168, the timing of shaft 39 relative to screw 91 is adjusted.

The tipped jar ejector station 82 is located in front of the forward end of the screw 91. Its function is to detect and eject from the line of jars moving horizontally forwardly along intake belt 81 such jars as may be tipped with their axes other than vertical.

A guide rail 181 is disposed horizontally along the outside of station 82—i.e., along the extreme outer edge of intake belt 81. The guide rail 181 is elevated above the surface of intake belt 81 a distance greater than the diameter of a jar 21, but less than the height thereof. Hence tipped jars may be laterally ejected in the space between the rail 181 and belt 81 into a convenient receptacle (not shown). An upright jar will extend above the level of guide rail 181. As it passes along, it contacts the forward, angularly disposed sensing portion 182 of first detecting lever 183, the rearward end of which is pivoted by means of pivot 184 to tipped jar ejecting frame 186 which is in turn mounted upon top plate 62. Second detecting lever 187 is pivoted by means of pivot 188 to frame 186, pivot 188 being located considerably forward therefrom compared with pivot 184. A resilient connector 189, such as a rubber ring, connects the outer end of second lever 187 with a portion of first lever 183 approximately at the midpoint of the latter. Lever 187 is a lever of the first class and its end opposite ring 189 has an arcuate pad 191 which contacts the outer end of valve rod 192, which projects outwardly from the interior of a conventional pneumatic valve 193. Valve 193 controls the flow of compressed air to pneumatic cylinder 194 located immediately beneath valve 193 and in communication therewith. Cylinder 194 actuates ejector lever 196, which is pivoted by means of pivot 197 to frame 186. Pipes 198 and 199 connect valve 193 with a source of high pressure and low pressure compressed air, as is well understood in this art.

The function of the ejector is as follows: Assuming that a jar is proceeding along intake belt 81 in an upright or normal manner, it contacts sensing portion 182 of first lever 183 and pushes the same inwardly. This in turn pushes the pad 191 of second lever 187 against the valve rod 192, which causes valve 193 to bleed air from control cylinder 194 so that ejector lever 196 is not actuated. However, assuming that a jar is tipped, then the lower pressure air entering valve 193 through pipe 199 projects rod 192 and lever 183 swings outwardly, its progress not being impeded by reason of the fact that there is no jar elevated above the level of the lever 183. Outward movement of rod 192 actuates valve 193 to allow high pressure air from pipe 198 to pass to control cylinder 194 to project ejector lever 196 into the path of the inwardly moving jars on belt 81 and hence pushes the tipped jar laterally outwardly with respect to the machine, causing the tipped jar to be expelled in the gap under rail 181. Lever 196 remains in projected position to divert tipped jars until the next upright jar contacts sensing portion 182.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A carrier for a container of the type having a peripheral groove adjacent one end thereof comprising a relatively thin body which is U-shaped in side elevation having a base of a width at least as great as twice the diameter of said container and arranged to support two containers in a single carrier and sides at least as high as the height of said container, protuberances extending inward from each said side positioned and dimensioned to fit within said groove and support a container thereby, and separating means to separate adjacent containers in said carrier, said carrier being formed with a longitudinal slot the width of said base and a pair of notches in said sides adjacent said base and constituting extensions of said slot, said slots and notches being formed and positioned to receive said separating means.

2. A carrier for a container of the type having a relatively wide mouth with a peripheral groove spaced a short distance downwardly of said mouth comprising a relatively thin body which is U-shaped in side elevation, open at each end and substantially completely open at the top, said body having a flat base with a width at least as great as twice the diameter of said container to support at least two containers side by side in a single carrier and substantially co-planar sides extending up from said base higher than the height of said container, at least one said side being provided with a thin, narrow, straight rib projecting out perpendicularly from said side a distance above said base substantially equal to the distance between said groove and the bottom of said container to fit within said groove of a container resting on said base and support a container thereby, said rib being discrete from said sides and spaced downwardly from the outer ends of said sides.

3. In combination, a carrier according to claim 2, shifting means projecting into the path of travel of said carrier for shifting a container from a first end to a second end of said carrier, and discharge means projecting into the path of travel of said carrier for shifting a container from said second end out of said carrier, said sides being cut out from each edge to receive said shifting means and said discharge means.

References Cited in the file of this patent

UNITED STATES PATENTS

| 807,687 | Schirmer | Dec. 19, 1905 |
| 2,344,975 | De Back | Mar. 28, 1944 |
| 2,487,033 | Thurman | Nov. 1, 1949 |

FOREIGN PATENTS

| 922,814 | France | Feb. 10, 1947 |